(12) United States Patent
Musgrave et al.

(10) Patent No.: US 6,202,151 B1
(45) Date of Patent: *Mar. 13, 2001

(54) SYSTEM AND METHOD FOR AUTHENTICATING ELECTRONIC TRANSACTIONS USING BIOMETRIC CERTIFICATES

(75) Inventors: Clyde Musgrave, Frisco, TX (US); Robert S. Dulude, Wellesley, MA (US)

(73) Assignee: GTE Service Corporation, Irving, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/001,324

(22) Filed: Dec. 31, 1997

Related U.S. Application Data

(60) Provisional application No. 60/046,012, filed on May 9, 1997, and provisional application No. 60/055,534, filed on Aug. 13, 1997.

(51) Int. Cl.[7] ........................................ G06K 9/46
(52) U.S. Cl. ............................... 713/186; 713/170
(58) Field of Search .................. 380/23, 25; 382/115, 382/116, 117, 118, 119, 124; 713/182, 186, 170

(56) References Cited

U.S. PATENT DOCUMENTS

| | | | |
|---|---|---|---|
| 4,109,237 | 8/1978 | Hill | 340/146.3 E |
| 4,405,829 | 9/1983 | Rivest et al. . | |
| 4,641,349 | 2/1987 | Flom et al. | 382/2 |
| 4,868,877 | 9/1989 | Fischer | 380/25 |
| 5,214,699 | 5/1993 | Monroe et al. | 380/23 |
| 5,224,173 | 6/1993 | Kuhns et al. . | |
| 5,259,025 | 11/1993 | Monroe et al. | 380/23 |
| 5,263,097 | 11/1993 | Katz et al. | 382/48 |
| 5,291,560 | * 3/1994 | Daugman | 382/117 |
| 5,386,104 | 1/1995 | Sime | 235/379 |
| 5,412,727 | 5/1995 | Drexler et al. . | |
| 5,428,357 | 6/1995 | Haab et al. | 341/155 |
| 5,457,747 | 10/1995 | Drexler et al. . | |
| 5,469,506 | * 11/1995 | Berson et al. | 380/23 |
| 5,534,855 | * 7/1996 | Shockley et al. | 340/825.3 |
| 5,581,630 | 12/1996 | Bonneau, Jr. | 382/116 |
| 5,604,802 | * 2/1997 | Holloway | 705/66 |
| 5,619,620 | 4/1997 | Eccles . | |
| 5,623,545 | 4/1997 | Childs et al. . | |
| 5,719,950 | * 2/1998 | Osten et al. | 382/115 |
| 5,748,738 | * 5/1998 | Bisbee et al. | 380/25 |
| 5,787,186 | * 7/1998 | Schroeder | 382/115 |
| 5,838,812 | * 2/1999 | Pare, Jr. et al. | 382/115 |
| 5,892,838 | * 4/1999 | Brady | 382/115 |
| 5,905,807 | * 5/1999 | Kado et al. | 382/118 |

* cited by examiner

Primary Examiner—Tod R. Swann
Assistant Examiner—Matthew Smithers
(74) Attorney, Agent, or Firm—Leonard Charles Suchyta

(57) ABSTRACT

A technique for combining biometric identification with digital certificates for electronic authentication called biometric certificates. The technique includes the management of biometric certificates through the use of a biometric certificate management system. Biometric certificates may be used in any electronic transaction requiring authentication of the participants. Biometric data is pre-stored in a biometric database of the biometric certificate management system by receiving data corresponding to physical characteristics of registered users through a biometric input device. Subsequent transactions to be conducted over a network have biometric certificates generated from the physical characteristics of a current user, which is then appended to the transaction, and which then authenticates the user by comparison against the pre-stored biometric data of the physical characteristics of users in the biometric database.

26 Claims, 3 Drawing Sheets

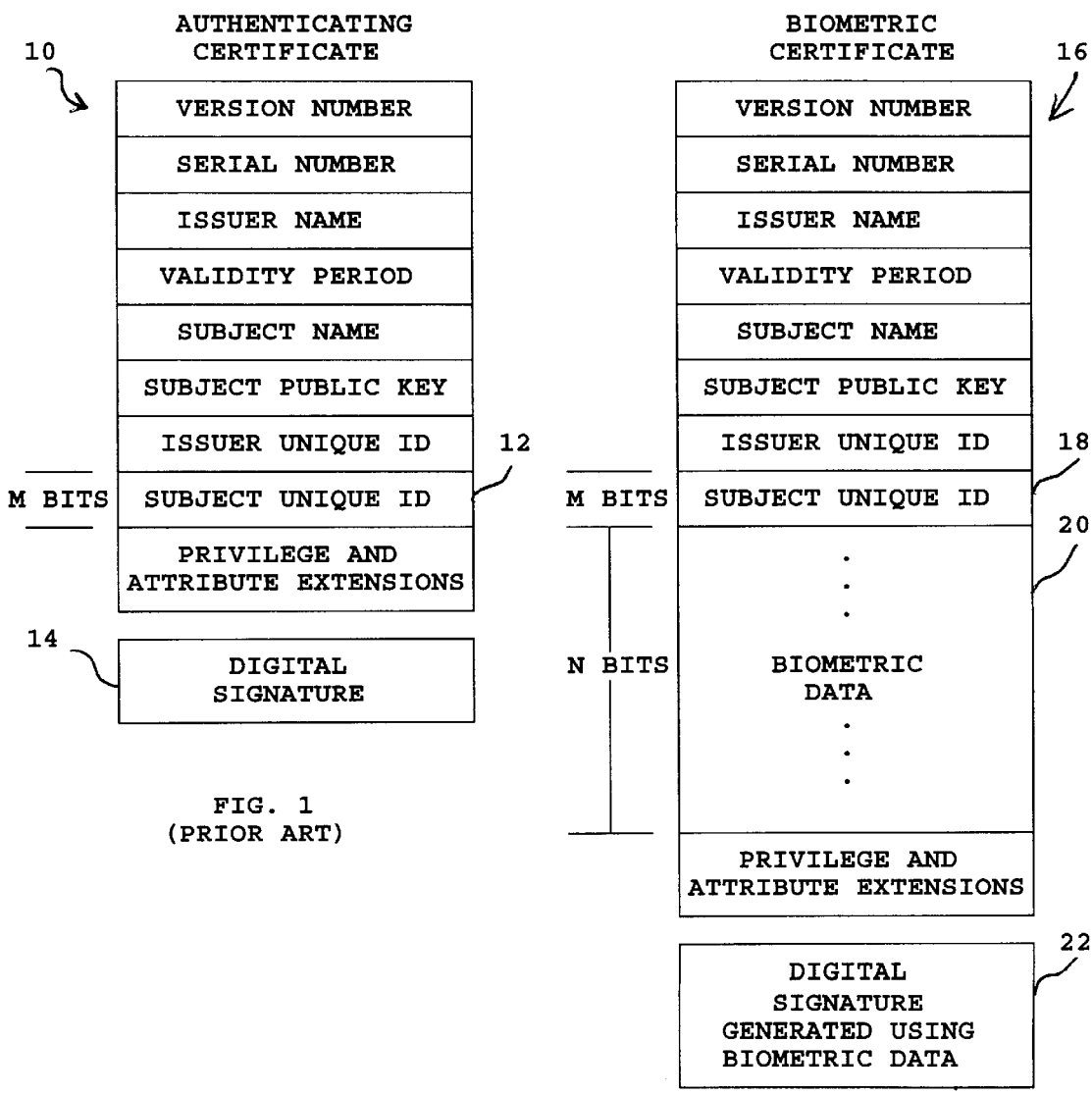

US 6,202,151 B1

SYSTEM AND METHOD FOR AUTHENTICATING ELECTRONIC TRANSACTIONS USING BIOMETRIC CERTIFICATES this application claim benefit to Provisional application 60/046,012 filed May 9, 1997 which claim benefit to Provisional application 60/055,534 filed Aug. 13, 1997.

BACKGROUND OF THE INVENTION

1. Field of the Invention

This disclosure relates generally to the field of secure communications, and in particular to the issuance and management of certificates for authenticating messages.

2. Description of Related Art

The use of computer networks and telecommunication systems for various transactions has markedly increased in recent years. Traditional transactions such as shopping, purchasing, banking, and investment services have experienced growth in new directions due to the application of computers and telecommunications.

While traditional transactions have heretofore been conducted typically on a person-to-person basis, many telecommunication-based transactions are conducted remotely and sight-unseen; i.e. the participants in telecommunication-based transactions may never meet.

With such telecommunication-based transactions, there is an increasing need to recognize and verify the authenticity of a remote user of electronic services, including such services involving consumers of all types of electronic transactions such as purchases over the Internet, home banking, electronic transfers of funds, and electronic brokerage services. Such electronic transactions may also involve users of remote repositories of data, for example, to access classified records, medical records, billing records, and unclassified but sensitive data, such as company records. Other relevant areas requiring adequate or even absolute security include authentication of signers of electronic documents such as contracts. In general, any electronic service of value, provided over a local network or a public network, requires authentication of the requester in order to protect the value of the service. More valuable services typically require a greater degree of authentication.

Historically, access to electronic services has been provided through identification techniques such as account names and authentication techniques such as personal identification numbers (PINs) and passwords. Such authentication techniques have not proven to be very secure since PINs and passwords are often easily guessed, hard to remember, or subject to discovery by exhaustive automated searches. Recently, digital certificates have emerged as a leading candidate for authenticating electronic transactions.

Ideally, a digital certificate, such as those defined by the X.509 and ANSI X.9 standards, allows users or buyers and sellers to authenticate electronic documents and electronic transactions in a manner analogous to the authentication of documents by a Notary Public in person-to-person transactions. The combination of cryptographic techniques, including public key cryptography, and the use of digital certificates provides greater integrity, privacy and a degree of authentication for on-line electronic transactions which instills a greater level of confidence in the electronic services consumer.

For example, such authenticating certificates in the prior art may be generated by concatenating a message and a public key with a set 10 of data as shown in FIG. 1, which may be in a sequence and which may include a unique subject ID 12 corresponding to the subject; that is, the individual or entity such as a corporation, having the public key. As shown in FIG. 1, other fields in the set 10 of data may include a version number, a serial number for the certificate with respect to a sequence of generated certificates, the name of the issuer, a validity period to determine an expiration of validity of the certificate, a subject name identifying the user or individual sending the transaction, a unique issuer ID number, and other data extensions indicating privileges and attributes of the certificate, such as access privileges.

The unique subject ID 12 of the user may include M bits representing, for example, a social security number or a password associated with the user sending the transaction. Typically, $M \approx 50$ bits $\approx 6$ bytes or less.

The authenticating certificate, being the concatenation of the set 10 of data with the public key and the transaction data, is then processed, for example, using a hash function such as a one-way hashing function, to generate a hashed value. The hashed value is then signed; that is, encrypted, using the private key of the user to generate a digital signature 14. The digital signature 14 is then appended to the authenticating certificate and the message, such as an electronic transaction, for transmission over, for example, a network.

The X.509 and ANSI X.9 standards described above incorporate a hash function to generate unique digital signatures 14 from a respective set 10 of data. Such one-way hashing functions enable the transaction data to be computationally infeasible to derive solely from the hash value.

While the use in the prior art of authenticating certificates incorporating digital certificates improves transactions employing electronic authentication, it still falls short of actually authenticating a human transactor, such as a consumer. Instead, such digital certificates in the prior art only authenticate the private cryptographic key used in the transaction or signature. Since private keys are physically stored on computers and/or electronic storage devices, such private keys are not physically related to the entities associated with the private keys. For example, a private key is assigned to an entity, which may be a group of people, an organization such as a company, or even groups of organizations, and so private keys are not limited to actual human individuals.

Identification indicia of individuals may be subdivided into two broad categories: indicia based on the physical characteristics of the individual, that is, what the individual is; and indicia based on assigned information, that is, what another individual has associated with the identified individual, or what the identified individual chooses with which to be associated. The first category having physical indicia relates to the biometric data of an individual, and includes characteristic features such as genetic composition, fingerprints, hand geometry, iris and retinal appearance, etc., which are unique to each individual, with known exceptions such as the identical genetic compositions of twins.

The second category having assigned indicia includes information which the individual knows and/or is charged with memorizing and divulging for authentication, such as social security number, mother's maiden name, access codes such as long distance calling card numbers, and personal passwords. The second category also includes information and/or objects which the individual owns and/or is charged with carrying and divulging for authentication, such as driver's licenses and passports.

Private keys are assigned indicia. Accordingly, the lack of physical identification of a human transactor with a private key is a flaw in authentication techniques in the prior art using such private keys. Other authentication and security techniques in the prior art are similarly flawed, since many authentication and security techniques rely on identification indicia of the second category.

Techniques are known in the art for authenticating an individual based on identification indicia of the first category; that is, by physical characteristics. For example, U.S. Pat. No. 4,641,349 to Flom et al. discloses a system for performing iris recognition. Typically, such physical characteristics identifying techniques require complicated computational operations for the capture and accurate classification of physical characteristics, since such physical characteristics are unique to each individual. Accordingly, the identification indicia for such physical characteristics generally requires a relatively large amount of memory to store and classify such identification indicia.

Heretofore, the relatively large computational demands of authentication techniques based on physical characteristics has prevented such authentication techniques from being implemented in electronic transactions.

SUMMARY OF THE INVENTION

It is recognized herein that the application of biometric identification and classification techniques to the authentication of electronic transactions provides for increased security and accuracy.

A biometric certification system and method are disclosed herein which implements an end-to-end security mechanism binding the biometric identification of consumers with digital certificates. The biometric certification system authenticates electronic transactions involving a user, and includes a biometric input device which responds to a set of physical characteristics of the user, and generates corresponding first biometric data related to the physical condition of the user. A hash function generator receives the first biometric data and generates a hash value signal from the first biometric data.

A registration authority generates a digital biometric certificate signal from a private key signal and from the hash value signal which incorporates the first biometric data. An electronic transaction generator responds to the digital biometric certificate signal and to transaction data to generate a data signal corresponding to the electronic transaction to be transmitted over a network. A receiver responds to the data signal received from the network and operates to extract the digital biometric certificate signal.

A biometric certification management system certifies the electronic transaction as being from the user, with the biometric certification management system including: a biometric data extractor which responds to the digital biometric certificate to isolate the first biometric data from the digital biometric certificate signal; and a classifier which responds to the first biometric data and to second biometric data retrieved from a biometric database and corresponding to the user. The classifier operates to compare the first biometric data to the second biometric data, and to generate an authentication decision signal corresponding to the comparison of the first and second biometric data. The receiver responds to the authentication decision and processes the electronic transaction as being authentic from the user or as being fraudulent.

BRIEF DESCRIPTION OF THE DRAWINGS

The features of the disclosed biometric certification system and method are readily apparent and are to be understood by referring to the following detailed description of the preferred embodiments of the present invention, taken in conjunction with the accompanying drawings, in which:

FIG. 1 illustrates an authenticating certificate in the prior art;

FIG. 2 illustrates a biometric certificate of the disclosed biometric certification system and method.

DESCRIPTION OF THE PREFERRED EMBODIMENTS

Referring in specific detail to the drawings, with common reference numbers identifying similar or identical elements, steps, and features, as shown in FIG. 2 the present disclosure describes a biometric certification system and method for generating biometric certificates from a set 16 of data, including a unique subject ID 18 and biometric data 20. A digital signature 22 generated using the biometric data 20 as described below is appended to the set 16 of data to form the biometric certificate, as shown in FIG. 2.

Figure 3:
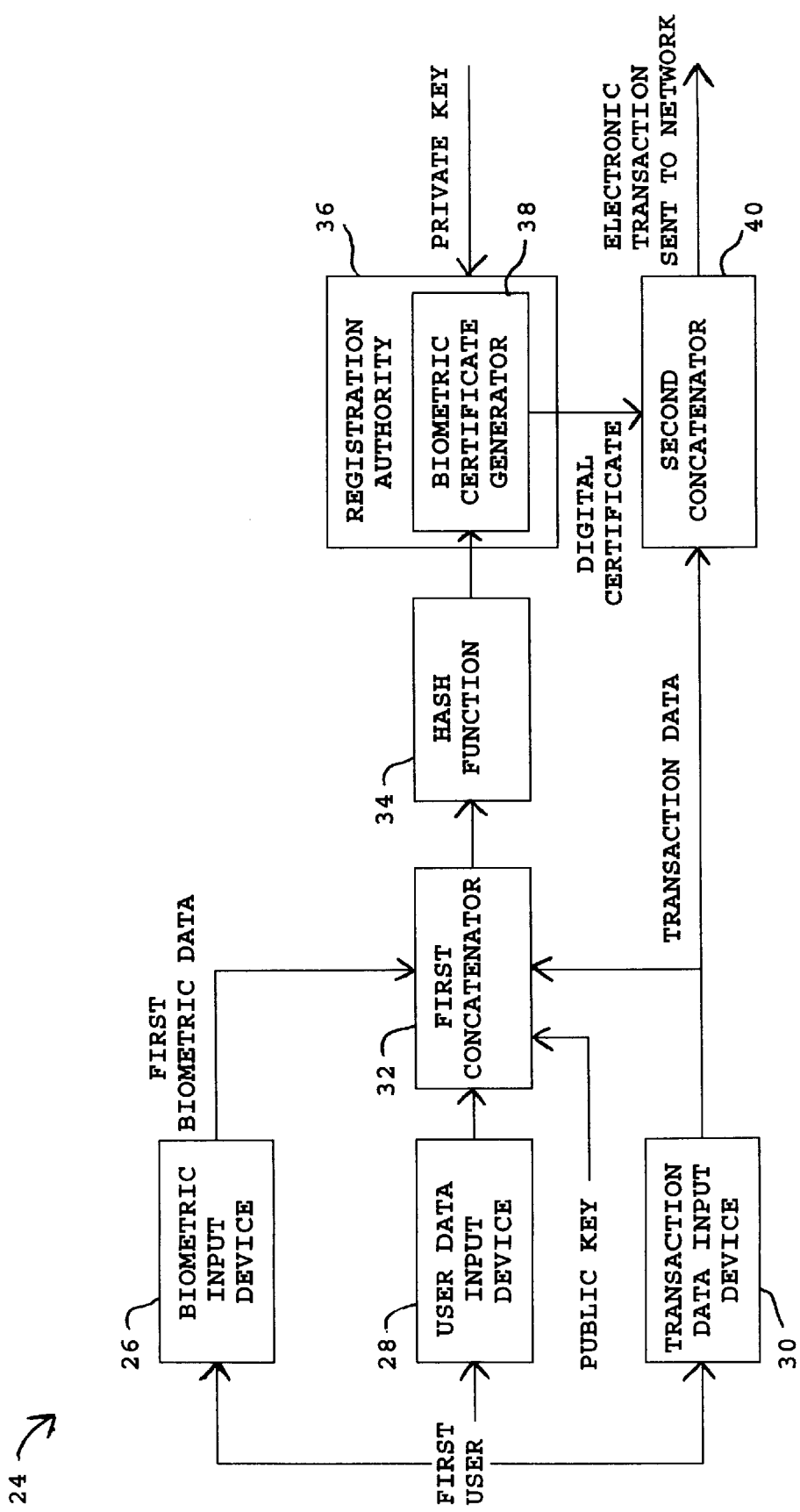
FIGS. 3–4 are block diagrams of the disclosed biometric certification system.
Figure 4:
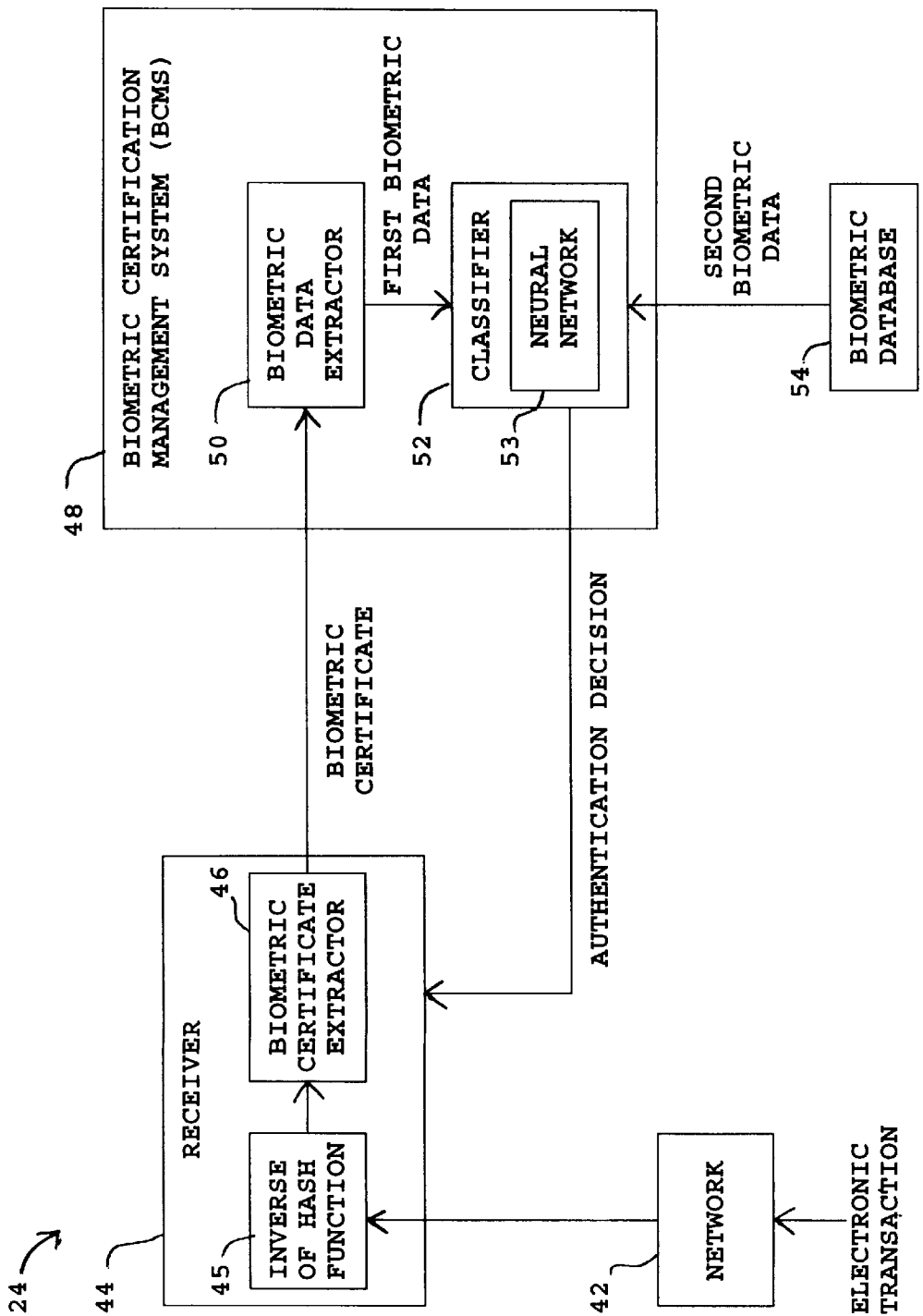

The disclosed biometric certification system 24 is shown in FIGS. 3–4. It has a set of input devices, including a biometric input device 26, a user data input device 28, and a transaction data input device 30. The biometric input device 26 generates first biometric data from the physical characteristics of the user, such as fingerprints, hand geometry, iris and retinal appearance, and speech patterns.

The biometric input device 26 may include visual cameras and/or other visual readers to input fingerprints, hand geometry, iris appearance, and retinal appearance. For example, companies such as IDENTIX, FUJITSU, and AUTHENTEC provide such equipment for reading fingerprints, while RECOGNITION SYSTEMS provides equipment to read hand geometry. EYE-DENTIFY is an example of a company which provides retinal imaging devices, while IRISCAN and SENSAR are examples of companies which provide iris imaging devices.

Alternatively, the biometric input device 26 may be adapted to receive audio characteristics of a user. For example, a microphone in conjunction with a speech digitizer may be used to receive and digitize speech. Such companies as BBN, T-NETIX, and ALPHA-TEL provide such equipment for receiving and digitizing speech to generate corresponding biometric data.

Biometric input devices known in the art may be used to receive other physical characteristics such as facial and body appearance via, for example, a camera, as well as the genetic composition of the user by means of genetic material gathering procedures, such as blood lancets.

The biometric certificate as shown in FIG. 2 may be generated by concatenating transaction data, a public key, and the set 16 of data, including the biometric data 20, using a first concatenator 32, which may be embodied as an adder. The transaction data is received from the transaction data input device 30 corresponding to the electronic transaction such as an electronic funds transfer. The set 16 of data is input through the user data input device 28 which may be in a sequence, as shown in FIG. 2, and which may include a unique subject ID 18 corresponding to the subject; that is, the individual or entity such as a corporation, having the public key. The set 16 of data also includes various other fields described above with respect to FIG. 1.

The biometric data 20 is obtained directly from the physical characteristics of the subject through the biometric input device 26. The unique subject ID 18 of the user may include M bits, in which typically M≈50 bits≈6 bytes or less, while the biometric data 20 typically includes much more data than the unique subject ID 18. Generally, the biometric data 20 has N bits in which N is about 64 bits or more; that is, about 6 bytes or more. In fact, the amount of the biometric data 20 is unlimited; for example, a fingerprint may be visually scanned to any resolution to obtain key fingerprint aspects which uniquely distinguish fingerprints, or alternatively to obtain data representing pixels of the entire fingerprint. Accordingly, the biometric data 20 may require large amounts of memory for storage such as 2 kB or even 4 MB. Accordingly, in the preferred embodiment, N is much greater than M.

The authenticating certificate, being the concatenation of the set 16 of data, including the biometric data 20, with the public key and the transaction data, is then processed, for example, using a hash function 34, such as a one-way hashing function, to generate a hashed value. RSA and SHA-1 are examples of public key cryptographic methods and one-way hashing which may be used for such encryption and hashing functions. The RSA method is described, for example, in U.S. Pat. No. 4,405,829 to Rivest et al., which is incorporated herein by reference. The SHA-1 method is described, for example, in U.S. Pat. No. 5,623,545 to Childs et al., which is incorporated herein by reference.

The hashed value is then sent to a registration authority (RA) 36 having a biometric certificate generator 38, in which the hashed value is signed; that is, encrypted, using the private key of the user to generate a digital signature 22, incorporating the biometric data 20. Using a second concatenator 40, which may be an adder circuit, the digital signature 22 is then appended to the transaction data from the transaction data input device 30 for transmission over, for example, a network 42 or the Internet.

Referring to FIG. 4, after receiving the electronic transaction from the network 42, a receiver 44 decrypts the electronic transaction using its private key, de-hashes the decrypted electronic transaction using an inverse 45 of the hash function 34, and extracts the biometric certificate 46 from the de-hashed data using a biometric certificate extractor 46, which may be an adder or a subtractor circuit for separating the biometric certificate from the rest of the data.

The receiver 44 then sends the biometric certificate to a biometric certificate management system (BCMS) 48 for authentication thereof. The BCMS includes a biometric data extractor 50 which extracts the first biometric data from the biometric certificate. The biometric data extractor 50 may be an adder or a subtractor circuit, which then applies to a classifier 52 the first biometric data allegedly corresponding (before authentication) to the user.

The BCMS 48 also accesses a biometric database 54 to obtain pre-stored biometric data from registered users identified by the user data, such as the unique subject ID 18 provided in the biometric certificate 20. After obtaining second biometric data corresponding to the user,-the BCMS 48 applies the second biometric data to the classifier 52 for classification with respect to the first biometric data.

The classifier 52 may be a comparator, or alternatively a software routine or other hardware/software devices implementing data matching techniques, for comparing the biometric data to obtain a decision value. Alternatively, the classifier 52 may be a trained neural network 53 and/or a fuzzy logic classifier for classifying whether or not, within an error tolerance, the first and second biometric data were obtained from the same individual using biometric input devices. Such classification methods for authentication of images and data sequences using neural networks are described, for example, in U.S. Pat. No. 5,619,620 to Eccles, which is incorporated herein by reference.

The classifier 52 then generates an authentication decision, which may be logic values corresponding to YES or NO, or TRUE or FALSE, indicating verification of the authenticity of the user sending the electronic transaction. Alternatively, the authentication decision may be a numerical value, for example, corresponding to a percentage of confidence of authenticity.

The receiver 44 then responds to the authentication decision to process the electronic transaction; for example, an electronic funds transfer. The receiver 44 may include a predetermined threshold of, for example, 98% authenticity, to be exceeded in order to proceed with the processing of the electronic transaction.

Using biometric certificates, cross-over error rates for identification and authentication may be below about 2.0%, and may even be as low as about 0.5%. The application of more advanced biometric input devices 26 and classifiers 52 known in the art may obtain substantially perfect authentication of any individual from the global population.

The disclosed biometric certification system 24 and method may include electronic transactions using a network as described in commonly assigned U.S. Pat. application No. 08/770,824, filed Dec. 20, 1996 and entitled "VIRTUAL CERTIFICATE AUTHORITY, which is incorporated herein by reference. Such a system can be adapted to include the use of biometric certificates as described herein for cryptographically binding the biometric data of a user with identification information to form such biometric certificates. The use of public key technology allows the transaction/signature authentication process to be done either centrally or remotely, depending upon the needs of the transaction.

The disclosed biometric certification system 24 and method may also be used for authenticating such cryptographic binding at the time of the electronic transaction or during electronic signature verification.

Prior to use of the disclosed biometric certification system 24 and method, the biometric database 54 is built using, for example, a registration process in which individuals are required to provide proof of identity; that is, identification information such as a birth certificate, a driver's license, current bank account data, credit card account data, etc. to be provided to the registration authority 36. Once the RA 36 is satisfied with such proof, the identification information is entered into the BCMS.48, and biometric measurement is then taken concurrently using at least one biometric input device 26.

Such stored biometric measurements form the pre-stored biometric data in the biometric database 54 which corresponds to the pre-registered individuals who have undergone the registration process described above. Accordingly, pre-registered individuals may be properly authenticated, while unregistered individuals are rejected, within the cross-over error rate.

While the disclosed biometric certification system and method is particularly shown and described herein with reference to the preferred embodiments, it is to be understood that various modifications in form and detail may be made therein without departing from the scope and spirit of the present invention. Accordingly, modifications, such as any examples suggested herein, but not limited thereto, are to be considered within the scope of the present invention.

What is claimed is:

1. A system for authenticating electronic transactions involving a user, comprising:
   a transaction input device configured to receive transaction data relating to an electronic transaction;
   a biometric input device configured to generate biometric data corresponding to a physical condition of the user;
   a biometric certificate generator configured to generate a biometric certificate from the transaction data, the biometric data, and a public key corresponding to the user;
   a hash function generator configured to generate a hash value signal from the biometric certificate using a hash function;
   a registration authority configured to generate a biometric digital signature from the hash value signal and a private key corresponding to the user;
   an electronic transaction generator configured to generate a transaction signal, corresponding to the electronic transaction to be transmitted over a network, from the biometric digital signature and the transaction data;
   a receiver configured to receive the transaction signal from the network and process the received transaction signal to extract the biometric certificate; and
   a biometric certificate management system configured to certify the electronic transaction as being from the user, including:
   a biometric data extractor configured to isolate the biometric data from the extracted biometric certificate, and
   a classifier configured to retrieve pre-registered biometric data corresponding to the user from a biometric database, compare the biometric data to the pre-registered biometric data, generate an authentication decision signal based on the comparison, and provide the authentication decision signal to the receiver to permit the receiver to determine whether the electronic transaction involves the user.

2. The system of claim 1, wherein the biometric input device includes at least one of:
   an iris reader configured to obtain a visual image of an iris of the user,
   a hand geometry reader configured to obtain a visual image of a geometry of a hand of the user,
   a retinal reader configured to obtain a visual image of a retina of the user,
   a facial reader configured to obtain a visual image of a face of the user,
   a body information extractor configured to obtain body data from the user, and
   a sound transducer configured to capture speech from the user.

3. The system of claim 1, wherein the biometric certificate generator includes:
   a concatenator configured to combine the transaction data, the biometric data, and the public key to form the biometric certificate.

4. The system of claim 3, wherein the concatenator includes an adder.

5. The system of claim 1, wherein the hash function generator is configured to subject the biometric certificate to a one-way hashing function to form the hash value signal.

6. The system of claim 1, wherein the registration authority is configured to encrypt the hash value signal using the private key to generate the biometric digital signature.

7. The system of claim 1, wherein the electronic transaction generator includes:
   a concatenator configured to combine the biometric digital signature and the transaction data to form the transaction signal.

8. The system of claim 7, wherein the concatenator includes an adder.

9. The system of claim 1, wherein the electronic transaction generator is further configured to transmit the transaction signal over the network.

10. The system of claim 1, wherein the receiver is configured to decrypt the received transaction signal using a private key.

11. The system of claim 1, wherein the receiver is configured to subject the received transaction signal to an inverse of the hashing function.

12. The system of claim 1, wherein the receiver is configured to decrypt the received transaction signal and to subject the decrypted transaction signal to an inverse of the hashing function.

13. The system of claim 1, wherein the classifier includes one of a neural network, a fuzzy logic classifier, and a processor.

14. A system for authenticating electronic transactions involving a user, comprising:
   means for receiving transaction data relating to an electronic transaction;
   means for obtaining biometric data corresponding to a physical condition of the user;
   means for generating a biometric certificate from the transaction data, the biometric data, and a public key corresponding to the user;
   means for generating a hash value signal from the biometric certificate using a hash function;
   means for generating a biometric digital signature from the hash value signal and a private key corresponding to the user;
   means for generating a transaction signal, corresponding to the electronic transaction, from the biometric digital signature and the transaction data;
   means for processing the transaction signal to extract the biometric certificate;
   means for isolating the biometric data from the extracted biometric certificate;
   means for retrieving pre-registered biometric data corresponding to the user from a biometric database;
   means for comparing the biometric data to the pre-registered biometric data to generate an authentication decision signal based on the comparison; and
   means for identifying the electronic transaction as one of authentic from the user and fraudulent.

15. A method for authenticating electronic transactions involving a user, comprising:
   receiving transaction data relating to an electronic transaction;
   obtaining biometric data corresponding to a physical condition of the user;
   generating a biometric certificate from the transaction data, the biometric data, and a public key corresponding to the user;
   generating a hash value signal by processing the biometric certificate using a hash function;
   generating a biometric digital signature from the hash value signal and a private key corresponding to the user;

generating a transaction signal, corresponding to the electronic transaction, from the biometric digital signature and the transaction data;

processing the transaction signal to extract the biometric certificate;

isolating the biometric data from the extracted biometric certificate;

retrieving pre-registered biometric data corresponding to the user from a biometric database;

comparing the biometric data to the pre-registered biometric data to generate an authentication decision signal based on the comparison; and determining whether the electronic transaction involves the user based on the authentication decision signal.

16. The method of claim 15, wherein the obtaining includes:

capturing at least one of a visual image of an iris of the user, a visual image of a geometry of a hand of the user, a visual image of a retina of the user, a visual image of a face of the user, body data from the user, and speech from the user.

17. The method of claim 15, wherein the generating a biometric certificate includes:

combining the transaction data, the biometric data, and the public key to form the biometric certificate.

18. The method of claim 15, wherein the generating a hash value signal includes:

subjecting the biometric certificate to a one-way hashing function.

19. The method of claim 15, wherein the generating a biometric digital signature includes:

encrypting the hash value signal using the private key.

20. The method of claim 15, wherein the generating a transaction signal includes:

combining the biometric digital signature and the transaction data to form the transaction signal.

21. The method of claim 15, wherein the processing the transaction signal includes:

decrypting the transaction signal using a private key.

22. The method of claim 15, wherein the processing the transaction signal includes:

subjecting the transaction signal to an inverse of the hashing function.

23. The method of claim 15, the processing the transaction signal includes:

decrypting the transaction signal, and subjecting the decrypted transaction signal to an inverse of the hashing function.

24. A method for generating an electronic transaction involving a user, comprising:

receiving transaction data relating to an electronic transaction;

obtaining biometric data corresponding to a physical condition of the user;

generating a biometric certificate from the transaction data, the biometric data, and a public key corresponding to the user;

generating a hash value signal from the biometric certificate using a hash function;

encrypting the hash value signal, using a private key corresponding to the user, to form a biometric digital signature;

generating a transaction signal, corresponding to the electronic transaction, by appending the biometric digital signature to the transaction data; and transmitting the transaction signal over a network for authentication of the electronic transaction.

25. A method for authenticating an electronic transaction involving a user, comprising:

receiving a transaction signal from a network, the transaction signal including transaction data relating to an electronic transaction and a biometric digital signature, the biometric digital signature including a hash value signal encrypted using a private key corresponding to the user, the hash value signal including the transaction data, biometric data obtained from the user and corresponding to a physical condition of the user, and a public key corresponding to the user subjected to a hashing function;

decrypting the received transaction signal using a private key;

de-hashing the decrypted transaction signal using an inverse of the hashing function;

isolating the biometric data from the de-hashed transaction signal;

retrieving pre-registered biometric data corresponding to the user from a biometric database;

comparing the biometric data to the pre-registered biometric data to generate an authentication decision signal based on the comparison; and identifying the electronic transaction as one of authentic from the user and fraudulent based on the authentication decision signal.

26. An electronic transaction stored in a computer-readable medium, comprising:

transaction data corresponding to a transaction performed by a user; and a biometric digital signature including a hash value signal encrypted using a private key corresponding to the user, the hash value signal including the transaction data, biometric data obtained from the user and corresponding to a physical condition of the user, and a public key corresponding to the user subjected to a hashing function.

* * * * *